United States Patent
Fleissner et al.

[15] 3,686,902
[45] Aug. 29, 1972

[54] APPARATUS FOR THE HEAT-TREATMENT OF TEXTILE MATERIAL

[72] Inventors: Heinz Fleissner; Gerold Fleissner, both of Egelsbach, Germany

[73] Assignee: Vepa AG

[22] Filed: March 24, 1970

[21] Appl. No.: 22,169

Related U.S. Application Data

[63] Continuation-in-part of Ser. No. 655,549, July 24, 1967, Pat. No. 3,503,231.

[30] Foreign Application Priority Data

March 24, 1969 Germany..........P 19 14 885.7

[52] U.S. Cl..................68/5 D, 68/177, 68/DIG. 5
[51] Int. Cl..............................D06c 1/06, D06c 1/10
[58] Field of Search........34/111, 115, 122, 242, 116, 34/123; 8/149.3, 156; 68/DIG. 5, 5 D, 184, 5 E, 177

[56] References Cited

UNITED STATES PATENTS

| | | |
|---|---|---|
| 3,242,702 | 3/1966 | Fleissner..............68/DIG. 5 |
| 3,450,486 | 6/1969 | Fleissner..............34/115 X |
| 1,163,252 | 12/1915 | Millspaugh..............8/156 |
| 3,343,187 | 9/1967 | Schiffer..............8/149.3 |
| 2,833,136 | 5/1958 | Prince et al..............68/5 D |
| 2,067,915 | 1/1937 | Haeberlin..............68/184 |

Primary Examiner—Edward L. Roberts
Assistant Examiner—Philip R. Coe
Attorney—Craig, Antonelli, Stewart & Hill

[57] ABSTRACT

The present disclosure is directed to a process and apparatus for the heat-treatment of textile materials wherein the material to be treated, for example thick material layers, can be heated shock-like to the treatment temperature and subsequently heated very uniformly. According to the present disclosure the treatment medium, for example steam, is evenly distributed throughout the treatment chamber.

21 Claims, 5 Drawing Figures

PATENTED AUG 29 1972

Inventors:

HEINZ FLEISSNER and GEROLD FLEISSNER

By Craig, Antonelli, Stewart & Hill
Attorneys 3,686,902

APPARATUS FOR THE HEAT-TREATMENT OF TEXTILE MATERIAL

CROSS REFERENCE TO RELATED APPLICATIONS

This application is a continuation-in-part of application, Ser. No. 655,549 filed July 24, 1967, now U.S. Pat. No. 3,503,231.

BACKGROUND OF THE INVENTION

The present invention relates to an apparatus for the heat-treatment of textile materials, wherein the apparatus is provided with at least one treatment chamber, at least one steam-permeable conveying element, preferably a conveyor belt of metal cloth and/or at least one sieve drum on which the textile material is guided through the treatment chamber. Above the conveying element, preferably a conveyor belt, there is provided another conveying element disposed at the inlet feed end of the treatment chamber which is penetrated by a treatment medium. Said conveying element can be, e.g., a sieve drum, sieve belt or vibrating chute, and is operable at a substantially higher conveying speed than the other conveying element.

The combination of a sieve drum and a sieve conveyor belt as described in the above-identified parent application is advantageous because it permits the textile material to be heated, shock-like, to the treatment temperature and thus even very thick material layers can be heated very uniformly.

Generally, a flow-through sieve drum which is provided with a conveyor belt, serves as an inlet feeding unit. It has been found that there may be disturbances at the point of passage between the feed conveyor and the sieve drum because the material curls up or tangles at this point. At the discharge end of the apparatus, there is a water-lock, i.e., a water curtain provided for sealing the treatment chamber. However, in some steaming processes with superheated steam, the material is dried while being conveyed through the treatment chamber and should not be wetted at the discharge end. The treatment chamber, in accordance with the parent application, is particularly advantageous for the treatment of wide material lengths or for the treatment of a number of material lengths. For narrow material lengths the treatment chamber must be relatively long if a high production capacity of, for instance, about 500 – 1,000 kg/h is required.

SUMMARY OF THE INVENTION

An object of the present invention is to avoid the prior art disadvantages in the treatment of textile materials.

Another object of the present invention is to provide an improved apparatus for the heat-treatment of textile materials wherein the treatment medium, for example steam, is evenly distributed throughout the treatment chamber.

A further object of the present invention is to eliminate undesirable disturbances which occur at the inlet of the heat-treatment chamber.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention it has been found that the disturbances arising at the inlet end of the apparatus can be avoided by installing a steam- or gas-permeable conveyor belt, e.g., a metal cloth belt at the inlet to the apparatus and by guiding this inlet feed conveyor belt around a second perforated conveying element, e.g., a sieve drum, which is penetrated by the treatment medium. However, it is also possible to replace the permeable conveyor belt by the upper part of the equally permeable feed conveyor, projecting into the treatment chamber.

The overall length of the steamer can be substantially shortened by associating at least one plaiting unit with the flown-through conveying element disposed at the inlet of the apparatus. The plaiting unit plaits the textile material transversely to the direction of material passage onto a conveying element, e.g., a sieve belt, which is disposed beneath said plaiting unit. It is advantageous to design the plaiter to have a swivelable plaiting nose and to arrange it beneath the inlet flow-through conveying element in such a way that the material can fall freely from this conveying element into the nose of said plaiting device.

Air-tightness of the steaming chamber can also be obtained by arranging the outlet opening in the treatment chamber beneath the reversing point of the conveyor belt and by installing underneath this outlet opening, and extending outside of the treatment chamber, a conveyor belt, a chute or the like, by means of which the material that falls through said opening can be removed from the treatment chamber for further processing, if desired.

It is desirable if the outlet opening of the treatment chamber is provided with funnel-shaped elements for directing the material therethrough and depositing it onto the outlet conveying element.

A very good treatment effect, especially an absolutely uniform and shock-like heating can be obtained if a thin layer of textile material is first penetrated by the treatment medium and if then a substantially thicker material layer is made to dwell in the treatment atmosphere. For preceding impregnating processes, as well as for the present drying process, it is suggested to guide the material around the conveying element in the form of a material length, a spread-out tube or a spread-out group of filaments (e.g., tow). The material length, tube or tow is then combined together to form a rope and then zig-zag plaited transversely to the direction of material passage.

Apart from the above described advantages of providing a sieve drum subject to a suction draft at the inlet feed end of the steamer, there is the further advantages that the fan which produces the suction draft in the drum interior forces the steam to circulate in a circular motion at the inlet feed end section of the steamer. This steam circulation is produced because the steam is drawn in by the sieve drum at that section which is not screened off by the inner baffle plate, discharged into the fan compartment and possibly returned into the space surrounding the sieve drum passing through additional heaters on the way, which regenerate the steam. This artificially produced steam circulation reinforces the natural upward flow of the steam which rises from the steam producing water sump on the steamer floor. This steam circulation within the steamer compartment is very advantageous for an intensive attack of the material by said steam.

Since the intensive steam circulation prevails only in the inlet feed end section of the belt steamer, it had originally been thought to arrange fans or the like over the total length of the steamer in order to obtain a better steam circulation within the entire steam-treatment chamber. However, this would have substantially complicated the design and measurably increased the manufacturing costs of the steamer. In order to resolve this problem, an artificial steam circulation in the entire length of the steamer had to be produced without, at the same time, raising the manufacturing costs or complicating the construction. According to the present invention, this was achieved by providing a metal sheet rail which projects into the steam cycle, that is the sieve drum – fan – fan compartment – housing – sieve drum element, which diverts a certain amount of steam from this main steam flow towards the discharge end of the apparatus. The rail interrupts the steam flow in the inlet feed end section of the belt steamer and guides the steam, which has a certain flow speed, over its total length towards the discharge end of the steamer. From there, the steam is then drawn back towards the sieve drum section by means of the negative pressure in the drum section that is produced by the suction draft of the fan. By this effective means, a desirable steam circulation is advantageously produced in the entire steamer.

An advantageous embodiment of the present invention is to provide the metal sheet rail along the entire length of the steamer and to install it near the steamer ceiling so that it does not impede material passage. This measure also ensures that the diverted steam is guided right to the discharge end of the machine. According to the present invention it is desirable if the rail is provided with openings which are arranged at certain distances from each other and through which the steam is led into the treatment chamber. Thus, the steam is not only directed to the discharge end section of the steamer but also over its entire length. Furthermore, devices for the vorticity of the air can be provided for on the rail, near the individual openings.

Another advantageous embodiment of the apparatus according to the present invention is that the rail can be supported to be swivelable towards the sieve drum so that, depending on the inclination of the rail, a smaller or a larger volume of steam can be diverted from the sieve drum and distributed over the whole length of the steamer. According to a further feature of the present invention, this rail can be U-shaped and upturned.

BRIEF DESCRIPTION OF THE DRAWINGS

The present invention will become more fully understood from the detailed description given hereinbelow and the accompanying drawings which are given by way of illustration only and thus are not limitative of the present invention and wherein.

Figure 1:
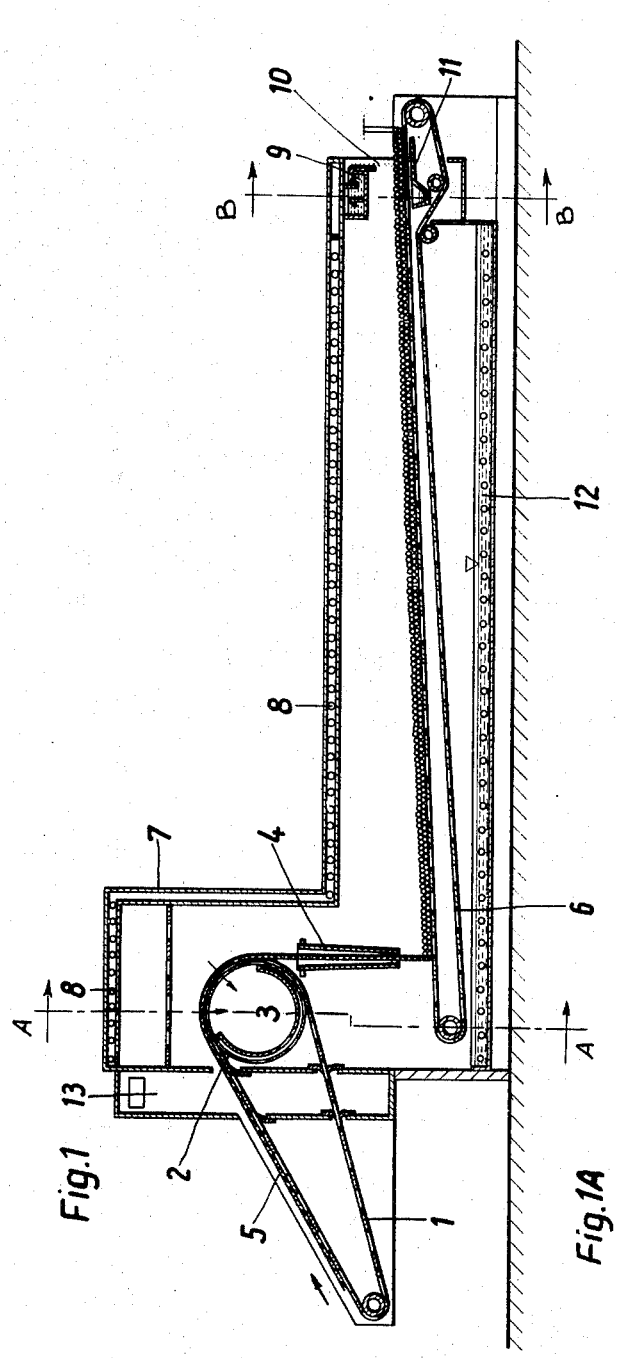
FIG. 1 is a longitudinal section of the apparatus of the present invention.
Figure 1B:
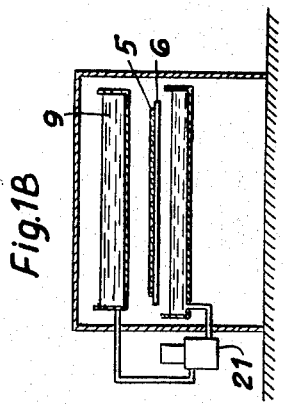
FIGS. 1A and 1B are cross-sectional views of the apparatus of FIG. 1 taken along lines A—A and B—B, respectively.
Figure 1A:
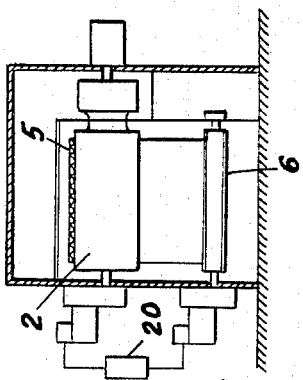

The apparatus of the present invention comprises a perforated belt 1 serving as an inlet feeding unit. This belt is guided around a sieve drum 2 which is subject to a suction draft. The section of the sieve drum 2 which is not covered by material being treated is screened against the suction draft by means of a baffle plate 3. A swivelable plaiting nose 4 is adjoined to the sieve drum 2. In this plaiting nose 4 the textile material 5, which was at first spread out as material lengths, is taken together to form a rope and plaited onto a perforated belt, transversely to the direction of material passage. Control means 20 for rotating sieve drum 2 faster than the perforated belt 6 is shown in FIG. 1A.

The steam-tight housing 7 is heated by means of heating coils 8 which are installed at the ceiling in order to prevent any condensate from forming on the ceiling. An overflow box 9 is provided at the discharge end of the housing 7. Sealing is effected by means of a water curtain (sluice) 10. The liquor that flows through the textile material is collected in a liquor container 11 and pumped back into the overflow box 9 by means of pump 21 as shown in FIG. 1B.

In the container floor a heated sump 12 is provided for producing the saturated steam. If the device is to be operated with superheated steam, the water is drained off the sump 12 and superheated steam blown into the steam-tight housing 7.

At the inlet feed end of the apparatus an entrance chamber 13 is provided. In this chamber the steam is circulated in order to remove the air from the material that is introduced into the apparatus.

Figure 2:
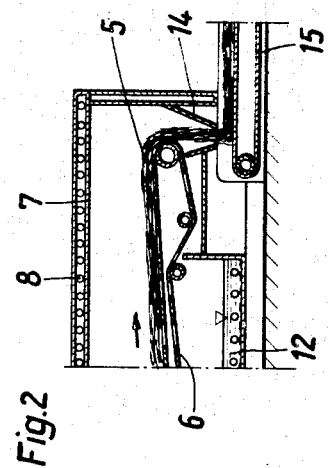
FIG. 2 is a longitudinal section of an alternative embodiment of the discharge end of the apparatus according to FIG. 1.

In the embodiment of the apparatus according to FIG. 2 the outlet opening 14 is arranged in the housing floor. The textile material 5 falls through the funnel-shaped opening 14 onto a conveyor belt 15 which is arranged below said opening, said conveyor belt transporting the material to the subsequent processing aggregates. The specific weight difference of air and steam ensures an excellent sealing of this opening in the housing floor.

Instead of a conveyor belt 6, a so-called boot or J-box (not shown) can be used, into which, the material that has been heated on the sieve drum 2 is introduced for dwelling purposes.

Figure 3:
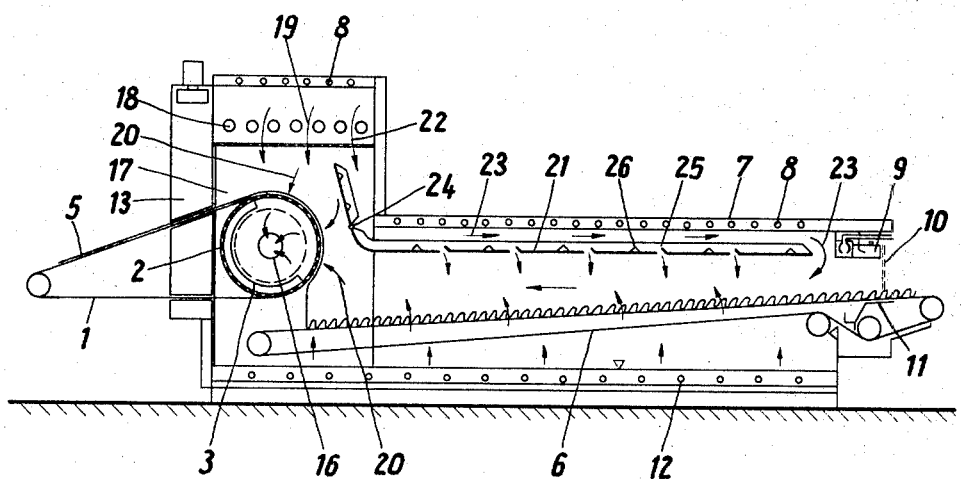
FIG. 3 shows the apparatus according to FIG. 1, provided with an advantageous constructional change, however.

According to FIG. 3, in exact alignment with the sieve drum 2 a fan 16 is installed in a well-known way which produces a suction draft in the drum interior. The fan 16 is situated behind a partition wall 17 which separates the so-called fan compartment from the drum compartment. From the fan compartment, the steam that has been drawn in by the fan, is blown through the heating tubes 18 where it is regenerated and recirculated back into the treatment chamber of the belt steamer (see lines 19 illustrating the steam flow). The steam is again drawn from the treatment chamber into the drum interior at that section of the drum which is not screened off by the inner baffle plate 3 (see the arrows 20).

From the steam flow 19 which is produced by the fan, a certain amount of steam 22 is diverted by means of a U-shaped rail 21 projecting into the flow 19 and guided towards the discharge end of the steamer because of the special shape of the rail 21. The steam movement that is thus produced above the rail 21 is illustrated in the drawing by arrows 23.

The rail 21 leads right to the discharge end portion of the belt steamer and produces an additional artificial steam circulation from the feed inlet end to the discharge end and from there back towards the sieve drum 2; This ensures the steam movement that is necessary for the successful treatment of textile material 5 to prevail over the entire length of the steamer.

The section of the U-shaped, upturned rail 21 which is near the sieve drum 2 is swivelable towards the drum by means of a hinge 24 so that, depending on the specific requirements, a smaller or larger amount of steam can be diverted from the steam cycle that is produced by the fan 14 of the sieve drum 2 and which prevails at the inlet feed end of the steamer. The diverted steam flows along the rail and a certain portion of it flows through the openings 25 into the treatment chamber of the belt steamer, this outward flow being facilitated by installed vorticity units 26 whereas the rest of the steam is returned at the end of the rail 21 and flows back towards the sieve drum 2.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. An apparatus for the heat-treatment of textile materials which comprises a treatment chamber, means for providing a gaseous treatment medium within said chamber, at least one gas-permeable conveying means rotatably disposed within said treatment chamber, at least one sieve drum means disposed above the gas-permeable conveying means at the inlet end of the treatment chamber, said sieve drum means being subjected to a suction draft and thus penetrated by the gaseous treatment medium, means for rotating the sieve drum means faster than the gas-permeable conveying means, inlet perforated conveyor belt means extending into said treatment chamber for introducing the textile material to the treatment chamber, one end of said conveyor belt means being wrapped around the sieve drum means in the treatment chamber, and outlet means for allowing discharge of the textile material from the treatment chamber and for sealing off the chamber from the surrounding atmosphere.

2. The apparatus of claim 1, wherein the gas-permeable conveying means is a conveyor belt.

3. The apparatus of claim 1, wherein heating means are provided in the ceiling of the treatment chamber.

4. The apparatus of claim 1, wherein said outlet means includes an overflow box provided at the outlet end portion of the treatment chamber, above the material being treated, said overflow box producing a liquid seal wherein the liquid penetrates the material at said end portion.

5. The apparatus of claim 4, wherein a liquid container is disposed below the material being treated and means are provided for recycling the liquid back to the overflow box.

6. The apparatus of claim 1, wherein a heated sump is provided in the treatment chamber.

7. The apparatus of claim 1, wherein an antechamber is disposed in front of the treatment chamber.

8. The apparatus of claim 1, wherein the outlet means includes an opening disposed in the floor of the treatment chamber and a conveyor belt is disposed below said opening for removing the material from the treatment chamber.

9. The apparatus of claim 8, wherein said opening is provided with funnel-shaped elements.

10. The apparatus of claim 1, wherein the sieve drum means is provided with a fan means which circulates the treatment medium in the treatment chamber.

11. The apparatus of claim 10, wherein the sieve drum is provided with a partition means which separates the inlet end portion of the treatment chamber into a drum compartment and a fan compartment.

12. The apparatus of claim 11, wherein heating elements are provided in the circulation zone of the treatment medium of said sieve drum means.

13. The apparatus of claim 1, wherein a rail means extends from the inlet end of the treatment chamber to the outlet end of said treatment chamber, said rail means diverting a portion of the treatment medium from the inlet end to the outlet end and to various points along the treatment chamber.

14. The apparatus of claim 13, wherein the rail means is U-shaped and is provided with a plurality of apertures along its length.

15. The apparatus of claim 14 wherein that portion of the rail means which is near the sieve drum means is provided with a hinge means which makes the rail means swivelable towards the drum means.

16. The apparatus of claim 15, wherein vorticity elements are provided along the rail means in front of the apertures disposed therein.

17. The apparatus of claim 13, wherein the rail means is disposed near the ceiling of the treatment chamber.

18. The apparatus of claim 1, wherein plaiting means are disposed between the conveying means and said sieve drum means at the inlet end of the treatment chamber for plaiting the textile material onto said gas-permeable conveying means.

19. The apparatus of claim 18, wherein the plaiting means is a swivelable plaiting means disposed below the sieve drum means which plaits the material transversely to the direction of material passage onto the conveyor belt.

20. The apparatus of claim 1, wherein said perforated conveyor belt means includes a conveyor belt made of gas permeable metal cloth.

21. The apparatus of claim 1, wherein said sieve drum means has a perforated surface and said one end of the conveyor belt means is arranged in contact with a portion of said perforated surface.

* * * * *